July 19, 1932.  J. H. KOHLER  1,868,478
LIFTING JACK
Filed April 25, 1928

INVENTOR.
John H. Kohler
BY Green & McCallister
ATTORNEYS.

Patented July 19, 1932

1,868,478

UNITED STATES PATENT OFFICE

JOHN H. KOHLER, OF PITTSBURGH, PENNSYLVANIA, ASSIGNOR, BY MESNE ASSIGNMENTS, TO WALKER MANUFACTURING COMPANY, OF RACINE, WISCONSIN, A CORPORATION OF WISCONSIN

LIFTING JACK

Application filed April 25, 1928. Serial No. 272,641.

This invention relates to lifting jacks and more particularly to lifting jacks of the telescoping screw type.

An object of this invention is to provide a screw jack of the type set forth of improved and simplified construction.

A further object is to provide a telescoping screw jack of rugged construction which will be simple to operate and cheap to manufacture and assemble.

Figure 1:
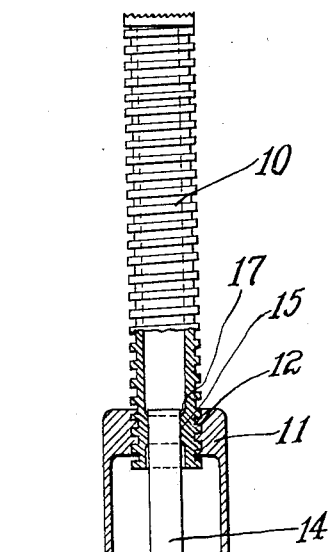
Figure 2:
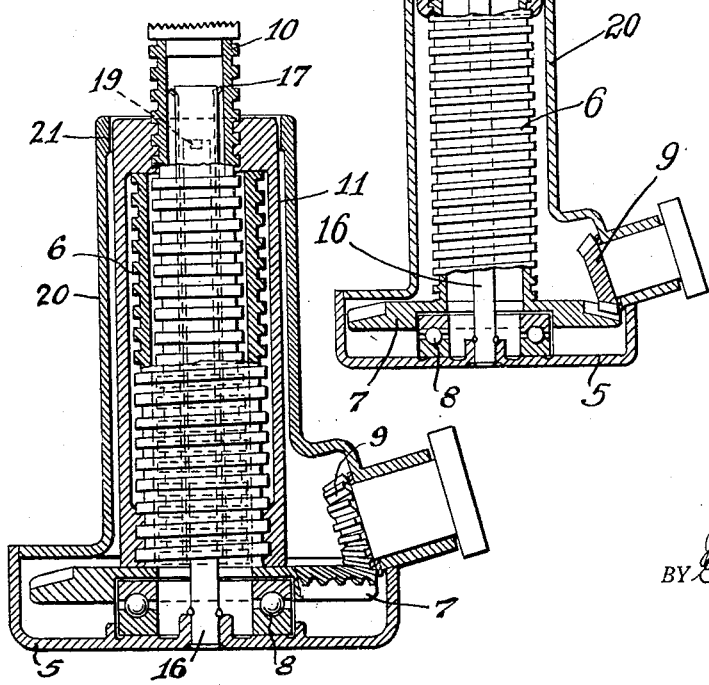

These and other objects which will be apparent to those skilled in this particular art are accomplished by means of the invention illustrated in the accompanying drawings in which Figure 1 is a transverse sectional view through a telescoping screw jack constructed in accordance with one embodiment of this invention and illustrating the parts in extended position, and Fig. 2 is a similar view showing the parts collapsed.

The particular embodiment of the present invention which has been chosen for the purposes of illustration includes a base 5 supporting a vertically extending, hollow, exteriorly threaded screw member 6 mounted on or secured to an operating gear 7 rotatably supported upon roller or ball bearings 8 on said base. A driving pinion 9, adapted to be operated by any suitable handle, is associated with the gear. An inner hollow externally screw threaded lifting member 10 is adapted to telescope within the outer threaded member and is connected to the outer member by a suitable connecting member which forms a part of the lifting mechanism and which is illustrated as a connecting sleeve 11 having inner screw threads 12 in its upper end engaging the threads of the inner threaded member 10, and also having inner screw threads 13 at its lower end engaging the threads of the lower, outer screw member 6. Rotation of the inner screw member 10 is prevented by means of a square or other non-circular shaped sleeve 14 slidably received in a similarly shaped opening 15 adjacent the lower end of the inner screw member and snugly fitting a square rod 16 secured to the base 5 and extending upwardly through the lower screw member 6. The rod 16 may have a circular lower end to permit rotation of the gear 7 through which it extends. The upper end of the hollow sleeve 14 has outwardly extending ears 17 to prevent withdrawal thereof from the upper screw member and the lower end of the sleeve 14 has an inwardly directed lug 18 engaging a lug 19 at the upper end of the stationary rod 16 to prevent separation thereof. The jack preferably has a vertically extending housing 20, the upper end of which has guiding surfaces 21 engaging the outer face of the intermediate connecting sleeve 11 for the purpose of guiding and bracing the parts.

Assuming the parts to be in the positions illustrated in Fig. 2, rotation of the gear 7 through the usual means, causes the outer threaded member 6 to be rotated and the friction of the parts is generally such that the outer sleeve 11 rotates therewith. As a result of the inner threaded member 10 being held against rotation, it is raised by the rotating sleeve 11 until it has reached the point where the end of its thread prevents further relative rotation between the inner threaded member 10 and the sleeve 11. As a result of this position of the elements, the sleeve 11 is now held against rotation so that further rotation of the gear 7 and outer threaded member 6 causes the sleeve 11 to rise until the parts assume the extended position shown in Fig. 1. Obviously, rotation of the operating gear 7 in the opposite direction will cause the parts to be collapsed as shown in Fig. 2.

What I claim as new and desire to secure by Letters Patent is:

A screw jack comprising in combination an exteriorly threaded hollow outer screw, an exteriorly threaded hollow inner screw adapted to telescope within the outer screw, a hollow connecting sleeve having a cylindrical outer portion and interiorly threaded at its upper end to engage with the inner screw and interiorly threaded at its lower end to engage the outer screw, a supporting housing in which the connecting sleeve is guided for free rotary and vertical movements, an annular bearing for supporting the outer screw from the bottom of the housing for rotary movement about a vertical axis, a driving shaft mounted in one side wall of the housing, gear connections between the driving shaft and the lower portion of the outer screw, and means for preventing rotary movement of the inner screw comprising a rod fixed at its lower end to the bottom of the housing and extending centrally upward through the screws, a second sleeve telescopically but non-rotatably engaging over the rod and within the lower end of the inner screw, and stop members for preventing longitudinal separation of the inner screw and second sleeve, and the second sleeve and rod.

In testimony whereof, I have hereunto subscribed my name this 20th day of March, 1928.

JOHN H. KOHLER.